US012050873B2

(12) United States Patent
Ramsl

(10) Patent No.: US 12,050,873 B2
(45) Date of Patent: Jul. 30, 2024

(54) SEMANTIC DUPLICATE NORMALIZATION AND STANDARDIZATION

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 456 days.

(21) Appl. No.: 17/513,188

(22) Filed: Oct. 28, 2021

(65) Prior Publication Data

US 2023/0139644 A1    May 4, 2023

(51) Int. Cl.
| | |
|---|---|
| G06F 40/30 | (2020.01) |
| G06F 16/33 | (2019.01) |
| G06F 16/36 | (2019.01) |
| G06F 40/247 | (2020.01) |
| G06N 20/00 | (2019.01) |

(52) U.S. Cl.
CPC .......... *G06F 40/30* (2020.01); *G06F 16/3343* (2019.01); *G06F 16/374* (2019.01); *G06F 40/247* (2020.01); *G06N 20/00* (2019.01)

(58) Field of Classification Search
CPC .... G06F 40/30; G06F 16/3343; G06F 16/374; G06F 40/247; G06F 40/237; G06F 40/284; G06N 20/00; G06N 3/08
See application file for complete search history.

(56) References Cited

U.S. PATENT DOCUMENTS

| | | | |
|---|---|---|---|
| 2008/0077396 A1* | 3/2008 | Hsu ...................... | G06F 40/274 704/10 |
| 2014/0280109 A1* | 9/2014 | Zomet ................. | G06F 16/3344 707/728 |
| 2014/0280178 A1* | 9/2014 | Benyamin ............. | G06F 16/285 707/740 |
| 2022/0172713 A1* | 6/2022 | Kwatra ................... | G10L 15/26 |

FOREIGN PATENT DOCUMENTS

CN  108804512 A  * 11/2018

* cited by examiner

*Primary Examiner* — Linda Wong
(74) *Attorney, Agent, or Firm* — SCHWEGMAN LUNDBERG & WOESSNER, P.A.

(57) ABSTRACT

Systems, methods, and computer-readable media are disclosed for list attribute normalization and standardization for creation of a controlled vocabulary. A vocabulary set comprising a plurality of vocabulary term may be received. For each vocabulary term, semantic duplicates may be identified. The semantic duplicates may be identified by analyzing semantics, syntactics, or phonetics of the vocabulary terms. Semantic chains may be formed from each vocabulary term and the corresponding semantic duplicates. The terms in each semantic chain may be ranked to determine a most probable vocabulary term. The most probable vocabulary term may then replace the semantic chain. The most probable vocabulary term across all semantic chains from the vocabulary set may form the controlled vocabulary.

20 Claims, 3 Drawing Sheets

SEMANTIC DUPLICATE NORMALIZATION AND STANDARDIZATION

TECHNICAL FIELD

Embodiments generally relate to natural language processing. More specifically, embodiments relate to systems and methods of natural language processing of semantic duplicates for automatic creation of a dynamically controlled vocabulary.

RELATED ART

Processing of large textual data sets can be difficult because of the existence of semantic duplicates. Textual data sets may be processed for creation of a controlled vocabulary. A semantic duplicate occurs when two separate text sequences comprise the same meaning. While a semantic duplicate may be a synonym, this is not always the case. For example, the words "mathematician" and "mathematics" are not synonyms but may be considered semantic duplicates; "mathematician" represents a profession, and "mathematics" represents the discipline of a mathematician. As such, when processing a data set comprising semantic duplicates such as "mathematician" and "mathematics," the semantic duplicates should be grouped together such that a search for "mathematics" also retrieves results for the term "mathematician." Semantic duplicates may also be present between terms that do not have textual similarity, but rather semantic similarity, such as "painter" and "art," that may require deduplication.

Semantic duplicates may be present in various data sets, such as job applicant data sets, that may be automatically processed and configured to perform keyword matching, for example. As such, as part of the processing of the data sets, semantic duplicate identification and resolution may be necessary to improve the processing of the data sets.

Controlled vocabularies are often statically created. As new entries are received into the data set, semantic duplicates present in the new entries may not be recognized and resolved by traditional systems. Thus, controlled vocabularies created for rapidly changing fields may quickly become irrelevant as the terminology evolves.

Accordingly, a need exists for dynamic list attribution normalization and standardization of data sets to identify and resolve semantic duplicates for creation of a controlled vocabulary. It would be advantageous for the controlled vocabulary to be dynamically pruned and expanded as additional entries are ingested.

SUMMARY

Disclosed embodiments address the above-mentioned problems by providing systems and methods for list attribute normalization and standardization for creation of a controlled vocabulary. A vocabulary set comprising a plurality of vocabulary terms may be ingested. Semantic duplicates may be identified for each vocabulary term in the vocabulary set. Semantic duplicate identification may comprise analyzing at least one of three dimensions of semantic duplicates: semantics, syntactics, and phonetics. The semantic dimension may comprise identifying semantic duplicates by recognizing synonyms for the vocabulary term. The syntactic dimension may comprise identifying semantic duplicates by measuring an edit distance for the vocabulary term. The phonetic dimension may comprise recognizing semantic duplicates with a phonetic algorithm. Once semantic duplicates have been identified for vocabulary terms in the vocabulary set, each vocabulary term may be combined with its semantic duplicates to form semantic chains. The terms in a semantic chain may then be ranked to determine a most probable vocabulary term in the semantic chain. The most probable vocabulary term may replace all terms in the semantic chain. The most probable vocabulary term from each of the semantic chains may be added to the controlled vocabulary. In some embodiments, the controlled vocabulary is dynamically extended and pruned as additional vocabulary terms are added and removed from the vocabulary set. In some embodiments, a machine learning model is used to enhance the creating, pruning, and expanding of the controlled vocabulary.

A first embodiment is directed to a computer-implemented method for list attribute normalization and standardization for generation of a controlled vocabulary, the computer-implemented method comprising receiving a vocabulary set, the vocabulary set comprising a plurality of vocabulary terms, and for each vocabulary term in the plurality of vocabulary terms: identifying at least one semantic duplicate, the at least one semantic duplicate identified from at least one of semantics of the vocabulary term, syntactics of the vocabulary term, or phonetics of the vocabulary term, forming a semantic chain, the semantic chain comprising the vocabulary term and the at least one semantic duplicate, determining a most probable vocabulary term in the semantic chain, the most probable vocabulary term selected from one of the vocabulary term or the at least one semantic duplicate, replacing the semantic chain with the most probable vocabulary term, and inserting the most probable vocabulary term into the controlled vocabulary.

A second embodiment is directed to one or more non-transitory computer-readable media storing computer-executable instructions that, when executed by a processor, perform a method for list attribute normalization and standardization for generation of a controlled vocabulary, the method comprising receiving a vocabulary set, the vocabulary set comprising a plurality of entries, each entry of the plurality of entries comprising a set of vocabulary terms, for each entry of the plurality of entries: identifying at least one semantic duplicate for each vocabulary term in the set of vocabulary terms, and creating a semantic chain for each vocabulary term in the set of vocabulary terms to obtain a plurality of semantic chains, a semantic chain of the plurality of semantic chains comprising the vocabulary term and the at least one semantic duplicate, and for each semantic chain in the plurality of semantic chains: determining a most probable vocabulary term, the most probable vocabulary term selected from one of the vocabulary term or the at least one semantic duplicate, and inserting the most probable vocabulary term into the controlled vocabulary.

A third embodiment is directed to a system for list attribute normalization and standardization for generation of a controlled vocabulary, the system comprising a processor, a data store, and one or more non-transitory computer-readable media storing computer-executable instructions that, when executed by the processor, perform a method for list attribute normalization and standardization for the generation of the controlled vocabulary, the method comprising retrieving, from the data store, a vocabulary set, the vocabulary set comprising a plurality of vocabulary term, identifying, for each vocabulary term in the vocabulary set, at least one semantic duplicate, forming, for each vocabulary term in the vocabulary set, a semantic chain, the semantic chain comprising the vocabulary term and the at least one semantic duplicate, determining, for each semantic chain, a most probable vocabulary term, and inserting the most probable vocabulary term into the controlled vocabulary.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
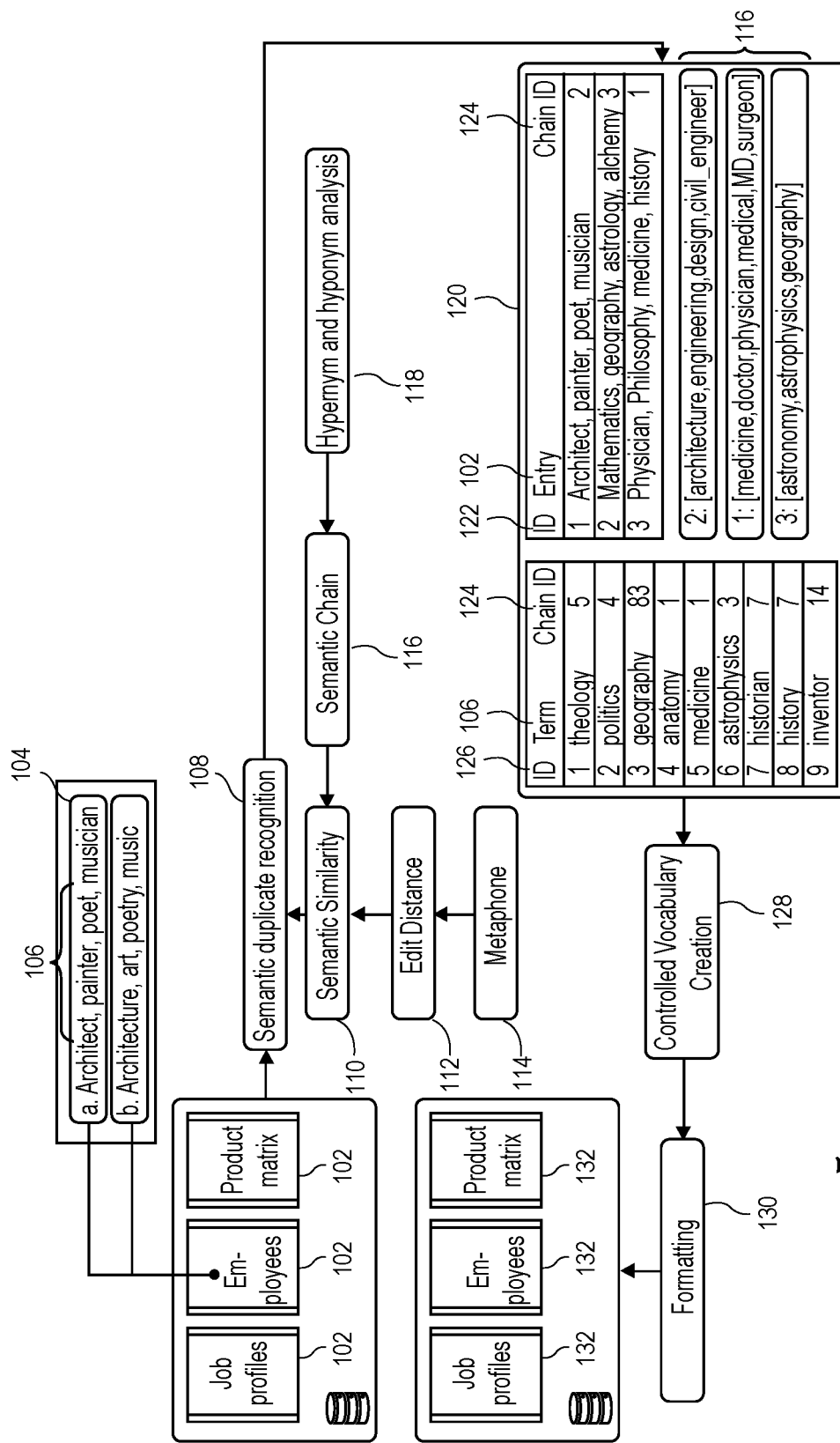
FIG. 1 illustrates a system flow overview for list attribute normalization and standardization of a data set for some embodiments.

The drawing figures do not limit the invention to the specific embodiments disclosed and described herein. The drawings are not necessarily to scale, emphasis instead being placed upon clearly illustrating the principles of the disclosure.

DETAILED DESCRIPTION

Systems and methods for list attribute normalization and standardization for creation of a controlled vocabulary are described herein. A vocabulary list comprising a plurality of vocabulary terms may be ingested. The vocabulary list may comprise data such as job profile data, employee data, product data, search engine terms, and the like. Entries in the vocabulary list may be semantic duplicates of one another. For example, the sentences "I want a multilingual artifact search, so I don't miss anything," and "I want to discover data sets in many languages," represent semantic duplicates of one another. Both sentences represent largely the same information conveyed using different words and phrases. Identifying and deduplicating the semantic duplicates may improve the searchability, filterability, and processing efficiency of the vocabulary list.

For each vocabulary term in the vocabulary list, semantic duplicates may be identified by analyzing semantics, syntactics, phonetics, or any combination thereof of the vocabulary term. Once semantic duplicates for a vocabulary term are identified, the vocabulary term and its semantic duplicates may be added to a list referred to as a semantic chain. Each term in the semantic chain may then be ranked to determine a most probable vocabulary term. In some embodiments, the most probable vocabulary term comprises the vocabulary term having the highest number of occurrences in the vocabulary list. The most probable vocabulary term may then replace all the terms in its respective semantic chain. Each of the most probable vocabulary terms may then form the controlled vocabulary. In some embodiments, the controlled vocabulary is formatted according to a common formatting standard. As such, the controlled vocabulary may represent the normalized and standardized vocabulary list having improved searchability over the initially ingested vocabulary list.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

FIG. 1 illustrates system flow 100 for list attribute normalization and standardization for some embodiments. In some embodiments, system flow 100 may be configured as an API. System flow 100 may be implemented in container-based architectures. In some embodiments, system flow 100 may be used in conjunction with a machine learning model. Data from system flow 100 may be fed into various neural networks such as, but not limited to, recurrent neural networks (RNNs), long short term memory networks (LSTMs), convolutional neural networks (CNNs), generative adversarial neural networks (GANs), transformer-based models (e.g., BERT), attention-based models, or any combination thereof. In some embodiments, system flow 100 is trained on training data (e.g., a corpus comprising known semantic duplicates) that is used to improve the recognition and resolution of semantic duplicates. As will be discussed below, in some embodiments, system flow 100 is configured to dynamically prune and extend the vocabulary list over time as new data entries are ingested. As new data is received, a machine learning model for system flow 100 may learn on the new data to improve the efficiency and accuracy of the learning model.

System flow 100 may begin with ingestion of data sets 102. As described above, data set 102 may comprise entries 104 with each entry 104 comprising at least one vocabulary term 106. In some embodiments, entry 104 comprises a sentence, phrase, vocabulary terms 106, or any combination thereof. For example, an entry 104 may comprise a list of terms entered as a discipline by job applicants for a particular job posting. In some embodiments, data set 102 comprises vocabulary terms 106 from various languages, including pictographic languages (e.g., Chinese). In some embodiments, system flow 100 operates on a single, target language for data set 102. Broadly, data set 102 may comprise any vocabulary term 106 encoded in Unicode or another text-encoding standard.

Data set 102 may comprise vocabulary terms 106 related to various fields and applications, such as job profile data, employee data, human resource taxonomies, product feature matrices, library data sets, and the like. Each of these data sets 102 may comprise entries 104 to be normalized and standardized as described in embodiments herein. For example, an employee data set 102 comprise semantic duplicates from employees' occupation, profession, job title, and the like. Additionally, an employee data set 102 may comprise duplicate employee entries, (e.g., due to human error), that may need to be deduplicated to result in an accurate data set 102. In some embodiments, system flow 100 performs list attribute normalization and standardization on a single data set 102 (e.g., the employees data set 102). In some embodiments, system flow 100 performs list attribute normalization and standardization on multiple data sets 102 together. For example, system flow 100 may deduplicate vocabulary terms 106 across both of the employees data set 102 and the job profiles data set 102.

A vocabulary term 106 in data set 102 may be a semantic duplicate of one or more other vocabulary terms 106 in data set 102. For example, as shown, entries 104 comprise vocabulary terms 106 "architect" and "architecture" which are semantic duplicates of one another. In this example, "architect" represents a person's occupation, while "architecture" represents the architect's discipline; thus, the two terms are considered semantic duplicates. If the two vocabulary terms 106 were present in a data set 102 of a job profile, for example, a user searching data set 102 would want a search or filter for "architect" to retrieve results for both "architect" and "architecture." As such, to improve the searchability of data set 102, semantic duplicates in data set 102 may be deduplicated as discussed further below. A more complex semantic duplicate scenario is depicted with the vocabulary terms 106 of "painter" and "art" (i.e., related occupation and discipline). However, unlike "architect" and "architecture," "painter" and "art" do not share substrings. As such, it may be necessary to recognize semantic duplicates without performing substring matching as will be discussed further below.

For list attribute normalization and standardization of a data set 102, data set 102 may first be processed at semantic duplicate recognition 108, whereby semantic duplicates may be recognized for vocabulary terms 106. In some embodiments, semantic duplicate recognition 108 comprises analyzing at least one of three dimensions of semantic duplicates: semantics, syntactics, phonetics, or any combination thereof. In some embodiments, semantic duplicate recognition 108 comprises analyzing the semantic dimension of vocabulary terms 106 at semantic similarity 110, the syntactic dimension of vocabulary terms 106 at edit distance 112, and the phonetic dimension of vocabulary terms 106 at metaphones 114. Once semantic duplicates are recognized, a semantic chain 116 for each vocabulary term 106 in data set 102 may be created. In some embodiments, hyponym analysis 118 is performed on vocabulary terms 106 to increase the generalization of data set 102 as will be discussed further below.

In some embodiments, data set 102 is analyzed to determine semantic duplicates for vocabulary terms 106 by performing a synonym check at semantic similarity 110. In some embodiments, a predefined number (e.g., 5, 10, 20, 50, etc.) of the most similar terms to a vocabulary term 106 are calculated. As an example, for vocabulary term 106 of "architect" the four most similar terms may be determined to be architecture, engineering, design, and civil engineer. Synonyms may be identified using open-source software such as Gensim. In some embodiments, synonyms are identified using topological similarity, statistical similarity, semantics-based similarity, or any combination thereof. In some embodiments, once vocabulary terms 106 are processed to identify synonyms, the synonyms and vocabulary terms 106 are stored in separate vocabularies (i.e., separate lists, tuples, etc.) within data set 102. As such, the size of data set 102 may increase upon determination of synonyms at semantic similarity 110. Because the synonyms comprise mappings to their vocabulary terms 106, processing of the synonyms may be less efficient than processing vocabulary terms 106. As such, storing the vocabulary terms 106 in a separate vocabulary list may allow for more efficient processing as the controlled vocabulary is created, extended, and pruned.

In some embodiments, identifying semantic duplicates comprises analyzing the syntactical dimension at edit distance 112. In some embodiments, edit distance 112 quantifies the dissimilarity between two different text strings. That is, the edit distance 112 between two sequences is the minimum number of single-character edits (e.g., insertions, deletions, substitutions) required to change one sequence into another. Thus, words having varying spelling in different regions of the world (e.g., organization and organisation) may be identified as semantic duplicates. Additionally, edit distance 112 may recognize semantic duplicates resulting from misspelled vocabulary terms 106. In some embodiments, a threshold number of edits for calculating edit distance 112 is specified for two terms to be considered semantic duplicates. For example, a threshold of two edits means that any sequence which can be changed into a second sequence with a maximum of two edits is considered a semantic duplicate of the second sequence. As such, "poet" from entry 104 A and "poetry" from entry 104 B may be identified as semantic duplicates of one another at edit distance 112 ("poet" requiring the addition of two characters to result in "poetry"). In some embodiments, a threshold of one edit to five edits is used for edit distance 112. In some embodiments, a threshold of two edits is used for edit distance 112. In some embodiments, edit distance 112 comprises one of the Levenshtein distance, the Demerau-Levenshtein distance, the Longest common subsequence (LCS), the Hamming distance, the Jaro distance, or any combination thereof, to identify semantic duplicates in data set 102. In some embodiments, semantic duplicates identified at edit distance 112 are added to the list of semantic duplicates identified at semantic similarity 110.

Semantic duplicates may also be identified at metaphone 114 wherein the phonetic dimension of vocabulary terms 106 may be considered. In some embodiments, metaphone 114 comprises a calculation of the phonetic closeness of vocabulary terms 106 by computing the metaphone similarity for each attribute in data set 102. In some embodiments, metaphone 114 utilizes a phonetic algorithm, such as Metaphone 3, Soundex, or other like algorithms to determine phonetic closeness. In some embodiments, vocabulary terms 106 sharing a phonetic encoding, as determined by the phonetic algorithm, are considered to be semantic duplicates. Semantic duplicates identified at metaphone 114 may be added to the list of semantic duplicates identified at semantic similarity 110.

After all vocabulary terms 106 in data set 102 have had their semantic duplicates identified via semantic similarity 110, edit distance 112, metaphone 114, or any combination thereof, each vocabulary term 106 may be combined with its identified semantic duplicates to create a semantic chain 116. Returning to the above example, semantic chain 116 for "architect" would comprise architect, architecture, engineering, design, and civil engineer.

In some embodiments, semantic chains 116 are augmented by performing hyponym analysis 118. Hyponym analysis 118 may comprise analyzing hypernyms and/or hyponyms of terms in semantic chain 116 to identify the specificity of a term in semantic chain 116. Hyponyms denote subtypes of words, while hypernyms denote supertypes of words. As an example, pigeon, crow, eagle, and seagull are all hyponyms of bird, as they each represent a subtype of bird. Bird, in turn, represents the hypernym (i.e., the supertype) of pigeon, crow, eagle, and seagull. Additionally, bird is itself a hyponym of animal, while animal serves as the hypernym of bird. By performing hyponym analysis 118 on semantic chain 116, terms may be generalized and classified under a broader umbrella. In some embodiments, vocabulary terms 106 are replaced in semantic chain 116 with the more general term at hyponym analysis 118. In some embodiments, the replaced term is stored in data set 102 (or an associated database) to provide additional context when searching the controlled vocabulary as discussed below.

Once semantic chains 116 have been created, each vocabulary term 106 in a semantic chain 116 may be ranked to determine the most probable vocabulary term. In some embodiments, the most probable vocabulary term is the vocabulary term 106 with the highest occurrence in data set 102 and may be selected from the semantic duplicates added to data set 102 at semantic duplicate recognition 108. In some embodiments, the most probable vocabulary term 106 is the vocabulary term 106 having the highest supertype in a semantic chain 116. For example, for the semantic chain architect, architecture, engineer, civil engineering, "engineer" may represent the broadest term and, therefore, may be considered the most probable vocabulary term 106. In some embodiments, the most probable vocabulary term 106 is selected according to the target language of data set 102. For example, if the target language is American English, "organization" may be selected over "organisation" even if "organisation" has a higher occurrence in data set 102.

After forming semantic chains 116, processing of data set 102 may proceed to semantic duplicate resolution 120 whereby the identified semantic duplicates may be resolved to reduce the dimensionality of data set 102. As described above, by adding the recognized semantic duplicates to data set 102 when forming semantic chain 116, the dimensionality of data set 102 rapidly increases. By increasing the size of data set 102, semantic duplicates may be identified and replace vocabulary terms 106 initially present in data set 102 and added to the controlled vocabulary. For example, "architect" and "architecture" may be replaced with "engineering" that was not present in entries 104 at initial ingestion of data set 102. However, once the most probable vocabulary term is identified, to promote efficient processing and searching of the controlled vocabulary, data set 102 may be reduced as discussed below.

In some embodiments, each entry 104 from data set 102 is indexed with an entry ID 122. In some embodiments, entries 104 are only indexed with an entry ID 122 if a semantic duplicate for a vocabulary term 106 in the entry 104 is identified using the above-described methods. In some embodiments, if no semantic duplicates for vocabulary terms 106 in an entry 104 are identified, the entry 104 is removed from data set 102. In some embodiments, if no semantic duplicates for vocabulary terms 106 in an entry 104 are identified, each vocabulary term 106 in the entry 104 is added to the controlled vocabulary as discussed in further detail below. In some embodiments, if no semantic duplicates for vocabulary terms 106 in an entry 104 are identified, the most probable vocabulary term from the entry 104 is added to the controlled vocabulary.

In some embodiments, each semantic chain 116 is indexed with a semantic chain ID 124. Each entry 104 and the corresponding entry ID 122 may then be linked to a semantic chain ID 124. In some embodiments, an entry 104 is linked to a semantic a semantic chain 116 in which a semantic duplicate for a vocabulary term 106 in entry 104 is present. Thus, as illustrated, the entry 104 having entry ID 122 of 1 is linked to semantic chain ID 124 of 2 in which "architecture" is an identified semantic duplicate of "architect." In some embodiments, entries 104 are assigned to more than one semantic chain IDs 126. For example, entry 104 having an entry ID 122 of 1 may be assigned to multiple semantic chain IDs 126 for each vocabulary term 106 in entry 104. That is, entry 104 may be assigned a semantic chain ID 124 for each of architect, painter, poet, and musician.

Each vocabulary term 106 in a semantic chain 116 may also be assigned a semantic chain ID 124. For example, as shown, the terms "medicine" from entry 104 having entry ID 122 of 3 has been assigned a semantic chain ID 124 of 1. As such, in some embodiments, both entries 104 and vocabulary terms 106 are assigned a semantic chain ID 124. Once all vocabulary terms 106 have been assigned to a semantic chain 116, all the vocabulary terms 106 assigned to the same semantic chain 116 may be ranked to determine a most probable vocabulary term 106. In some embodiments, the most probable vocabulary term 106 is the vocabulary term 106 with the highest occurrence in data set 102. By replacing semantic chains 116 with the most probable vocabulary term 106, the dimensionality of data set 102 is reduced to improve computation and searching speeds. The set of most probable vocabulary terms 106 from the plurality of semantic chains 116 may then form controlled vocabulary 128.

As mentioned above, controlled vocabulary 128 may be dynamically extended and pruned. By pruning and extending controlled vocabulary 128, controlled vocabulary 128 may maintain an up-to-date vocabulary comprising the most relevant terms from data set 102. As vocabulary terms 106 become less used in data set 102, they may be removed from controlled vocabulary 128. In some embodiments, as new entries 104 are received, the new entries 104 follow the above-described process of semantic duplicate identification and resolution. If a new entry 104 comprises a vocabulary term 106 (or a semantic duplicate of vocabulary term 106) deemed to be the most probable term, the term may be added to controlled vocabulary 128. Consequently, in some embodiments, vocabulary terms 106 in controlled vocabulary 128 are removed if a more probable vocabulary term 106 is introduced into data set 102. In some embodiments, to promote a high density and concise controlled vocabulary 128, only vocabulary terms 106 having an occurrence in data set 102 over a predefined threshold are considered for entry into controlled vocabulary 128. That is, any vocabulary term 106 in an entry 104 that does not occur in data set 102 above the predefined threshold do not undergo the above-described semantic duplicate identification and resolution processes. As such, an update to data set 102 in which entries 104 are removed therefrom may cause the removal of vocabulary terms 106 from controlled vocabulary 128. In some embodiments, the predefined threshold is 10 occurrences, 20 occurrences, 50 occurrences, 100 occurrences, or any other user-configurable number.

Once controlled vocabulary 128 is created, controlled vocabulary 128 may be formatted at formatting 130. In some embodiments, formatting 130 comprises formatting controlled vocabulary 128 according to the Common Locale Data Recognition (CLDR) as defined by Unicode. Formatting 130 may allow for formatting texts from different locales. For example, formatting 130 may allow for dates and times written in differing formats to be converted to a standard format, thus improving the search space across various languages. Once formatting 130 has been applied to controlled vocabulary 128, normalized data set 132 may be obtained comprising the normalized and standardized controlled vocabulary 128. In some embodiments, data set 102 is formatted according to formatting 130 prior to processing at semantic duplicate recognition 108.

In some embodiments, system flow 100 is configured for human-in-the-loop interactions such that users can configure system flow 100. For example, as described above, users may set the occurrence thresholds for considering new vocabulary terms 106 for entry into controlled vocabulary 128. In some embodiments, users can provide feedback on identified semantic duplicates. Users may indicate (e.g., via a GUI) incorrectly identified semantic duplicates and/or provide corrections to identified semantic duplicates. Additionally, in some embodiments, users may correct incorrectly assigned semantic chain IDs 126 to vocabulary terms 106. In some embodiments, the machine learning model used in conjunction with system flow 100 is adjusted in response to user feedback. Users may also export the vocabulary and lists (e.g., the separate list of vocabulary terms 106 and the list of semantic duplicates) in order to create taxonomies and/or organigrams.

Figure 2:
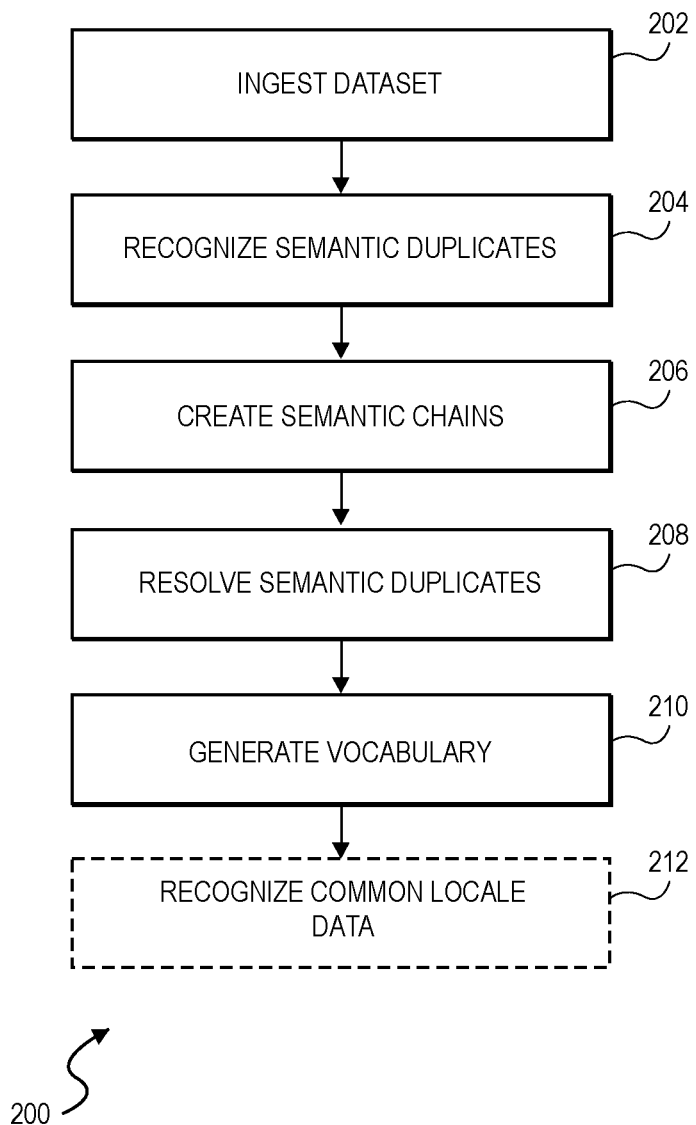
FIG. 2 illustrates an exemplary method for list attribute normalization and standardization for some embodiments.

FIG. 2 illustrates an exemplary method 200 for list attribute normalization and standardization to create a controlled vocabulary 128 for some embodiments. Method 200 may begin with the ingestion of data set 102 at step 202. As described above, data set 102 may comprise a plurality of entries 104 forming a vocabulary set of vocabulary terms 106. Vocabulary terms 106 may have semantic duplicates present in the data set 102 which may need to be deduplicated and removed from data set 102 for creation of controlled vocabulary 128.

Next, at step 204, semantic duplicates may be recognized in data set 102. As described above, three dimensions of semantic duplicates, semantics, syntactics, and phonetics, may be considered for identifying semantic duplicates in data set 102. The semantic dimension may be analyzed at semantic similarity 110 whereby synonyms for vocabulary terms 106 in data set 102 are identified. In some embodiments, for each vocabulary term 106 in data set 102, ten synonyms are identified. The syntax dimension may be analyzed at edit distance 112 whereby the Levenshtein distance (or another edit distance measurement) is calculated to identify semantic duplicates that are the result of a misspelling or regional spelling differences. The phonetic dimension may be analyzed at metaphone 114 whereby a phonetic algorithm may be employed to identify semantic duplicates based on phonetics of vocabulary term 106.

Once semantic duplicates are identified, a semantic chain 116 may be formed for each vocabulary term 106 in data set 102 at step 206. In some embodiments, semantic chain 116 comprises the vocabulary term 106 and its corresponding semantic duplicates identified at step 204. In some embodiments, semantic chains 116 are augmented by a hyponym analysis 118. Hyponym analysis 118 may be used to generalize a more specific or niche term, such as generalizing the term "brain surgeon" to "surgeon" or "doctor." As described above, the more specific term generalized at hyponym analysis 118 may be stored. As such, a search for "doctor" may bring up a list of employees categorized under doctor, and each employee may have their more specific term saved such that the specialties of the doctors are still present in data set 102.

Next, at step 208, the identified semantic duplicates added to data set 102 may be resolved. Semantic duplicate resolution 120 may comprise linking each vocabulary term 106 to a semantic chain 116. Once all vocabulary terms 106 are linked to semantic chains 116, the most probable vocabulary term 106 for each semantic chain 116 may be identified. Thereafter, semantic chain 116 may be replaced by the most probable vocabulary term 106. As such, the dimensionality of data set 102 may be significantly reduced.

At step 210, controlled vocabulary 128 may be generated from the most probable vocabulary terms 106 from all semantic chains 116. Thus, controlled vocab may comprise the most representative words of the data set 102. Lastly, at optional step 212, formatting 130 may be applied to controlled vocabulary 128 to format vocabulary terms 106. As described above, vocabulary terms 106 originating from various regions and dialects across the globe may comprise various formats. For example, someone from the United States may enter a date in a MM-DD-YYYY format, while someone from Germany may enter a date in a YYYY-MM-DD format. These two data points may then be formatted at formatting 130 into a common format, such as CLDR. Thus, controlled vocabulary 128 may become an easily searchable and unified data set.

As new entries 104 are ingested into data set 102, method 200 may automatically repeat such that controlled vocabulary 128 is dynamically pruned and extended. In some embodiments, entries 104 may be received on a recurring basis and added to data set 102. Entries 104 comprising vocabulary terms 106 having an occurrence over the predefined threshold may be considered for entry into controlled vocabulary 128. In some embodiments, all vocabulary terms 106 are considered for entry into controlled vocabulary 128. In some embodiments, the predefined threshold dynamically changes, such that the threshold increases or decreases according to user-defined parameters. For example, for initial generation of controlled vocabulary 128, the predefined threshold may be five entries in data set 102 to create an initially large controlled vocabulary 128, while for a later iteration of controlled vocabulary 128, the threshold may be raised to twenty entries to prune controlled vocabulary 128.

Figure 3:
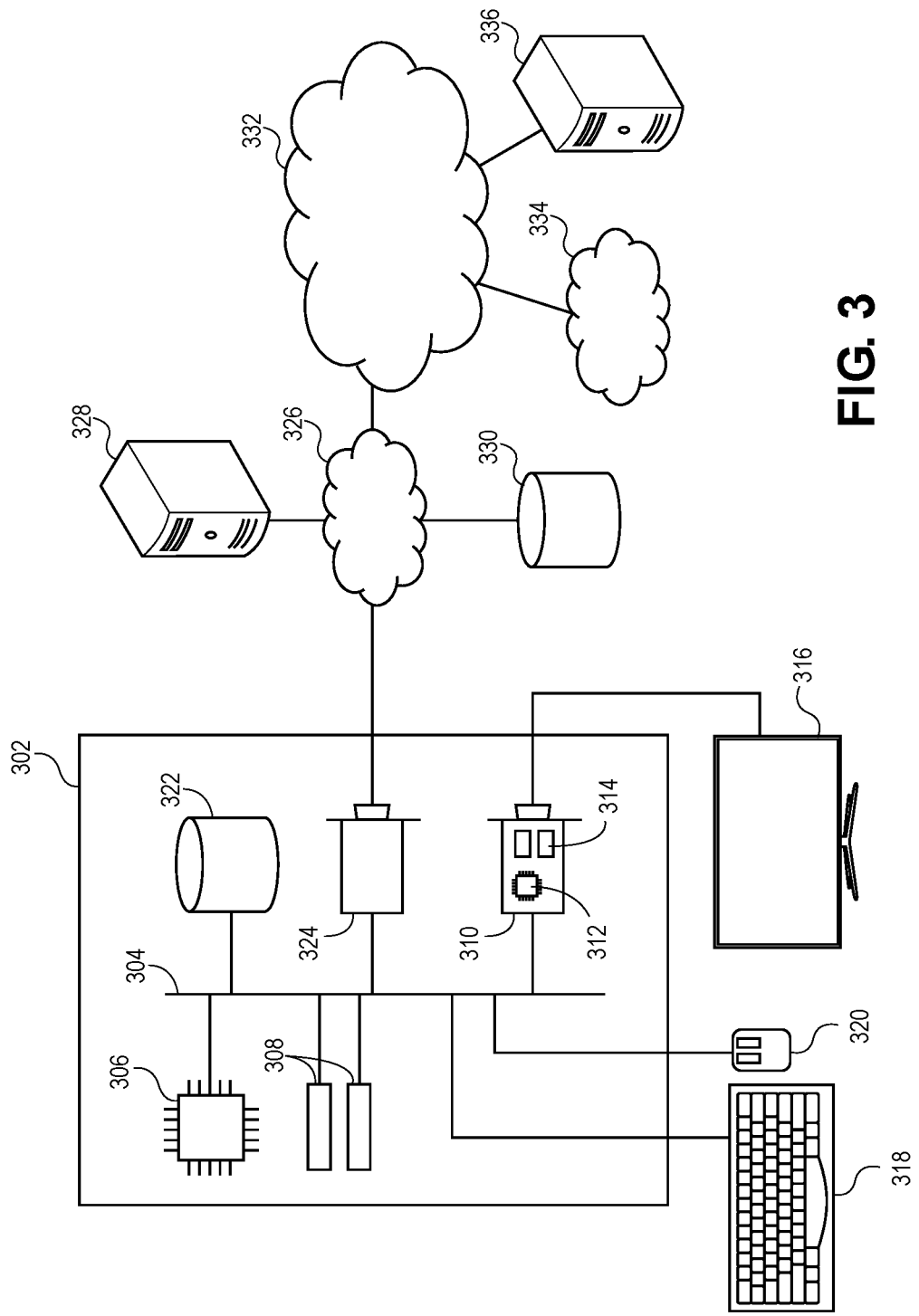
FIG. 3 illustrates an exemplary hardware platform for certain embodiments.

Turning now to FIG. 3, in which an exemplary hardware platform for certain embodiments is depicted. Computer 302 can be a desktop computer, a laptop computer, a server computer, a mobile device such as a smartphone or tablet, or any other form factor of general- or special-purpose computing device containing at least one processor. Depicted with computer 302 are several components, for illustrative purposes. In some embodiments, certain components may be arranged differently or absent. Additional components may also be present. Included in computer 302 is system bus 304, via which other components of computer 302 can communicate with each other. In certain embodiments, there may be multiple busses or components may communicate with each other directly. Connected to system bus 304 is central processing unit (CPU) 306. Also attached to system bus 304 are one or more random-access memory (RAM) modules 308. Also attached to system bus 304 is graphics card 310. In some embodiments, graphics card 310 may not be a physically separate card, but rather may be integrated into the motherboard or the CPU 306. In some embodiments, graphics card 310 has a separate graphics-processing unit (GPU) 312, which can be used for graphics processing or for general purpose computing (GPGPU). Also, on graphics card 310 is GPU memory 314. Connected (directly or indirectly) to graphics card 310 is display 316 for user interaction. In some embodiments no display is present, while in others it is integrated into computer 302. Similarly, peripherals such as keyboard 318 and mouse 320 are connected to system bus 304. Like display 316, these peripherals may be integrated into computer 302 or absent. Also connected to system bus 304 is local storage 322, which may be any form of computer-readable media, such as non-transitory computer readable media, and may be internally installed in computer 302 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 324 is also attached to system bus 304 and allows computer 302 to communicate over a network such as network 326. NIC 324 can be any form of network interface known in the art, such as Ethernet, ATM, fiber, Bluetooth, or Wi-Fi (i.e., the Institute of Electrical and Electronics Engineers (IEEE) 802.11 family of standards). NIC 324 connects computer 302 to local network 326, which may also include one or more other computers, such as computer 328, and network storage, such as data store 330. Generally, a data store such as data store 330 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 328, accessible on a local network such as local network 326, or remotely accessible over public Internet 332. Local network 326 is in turn connected to public Internet 332, which connects many networks such as local network 326, remote network 334 or directly attached computers such as computer 336. In some embodiments, computer 302 can itself be directly connected to public Internet 332.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for list attribute normalization and standardization for generation of a controlled vocabulary, the method comprising:
   receiving a vocabulary set, the vocabulary set comprising a plurality of vocabulary terms; and
   for each vocabulary term in the plurality of vocabulary terms:
      identifying at least one semantic duplicate, the at least one semantic duplicate being at least one other vocabulary term in the plurality of vocabulary terms and identified based on at least one of semantics of the vocabulary term, syntactics of the vocabulary term, or phonetics of the vocabulary term, the identifying comprising computing a Levenshtein distance between the vocabulary term and the at least one semantic duplicate; and
      forming a semantic chain, the semantic chain comprising the vocabulary term and the at least one semantic duplicate;
   for each semantic chain:
      determining a most probable vocabulary term in the semantic chain; and
      adding the most probable vocabulary term to the controlled vocabulary.

2. The media of claim 1, wherein identifying the at least one semantic duplicate from the semantics of the vocabulary term comprises determining at least one synonym for the vocabulary term.

3. The media of claim 1, wherein the most probable vocabulary term comprises the vocabulary term in the semantic chain having a highest occurrence in the vocabulary set.

4. The media of claim 1, wherein the Levenshtein distance is computed with a threshold of two edits.

5. The media of claim 1, wherein identifying the at least one semantic duplicate from the phonetics of the vocabulary term comprises computing a phonetic similarity between the vocabulary term and the at least one semantic duplicate.

6. The media of claim 1, wherein the method further comprises:
   identifying a hypernym for the vocabulary term to generalize the vocabulary term; and
   replacing the vocabulary term with the hypernym.

7. A computer-implemented method for list attribute normalization and standardization for generation of a controlled vocabulary, the computer-implemented method comprising:
   receiving a vocabulary set, the vocabulary set comprising a plurality of vocabulary terms; and
   for each vocabulary term in the plurality of vocabulary terms:
      identifying at least one semantic duplicate, the at least one semantic duplicate being at least one other vocabulary term in the plurality of vocabulary terms and identified based on at least one of semantics of the vocabulary term, syntactics of the vocabulary term, or phonetics of the vocabulary term, the identifying comprising computing a Levenshtein distance between the vocabulary term and the at least one semantic duplicate; and
      forming a semantic chain, the semantic chain comprising the vocabulary term and the at least one semantic duplicate;
   for each semantic chain:
      determining a most probable vocabulary term in the semantic chain; and
      adding the most probable vocabulary term to the controlled vocabulary.

8. The computer-implemented method of claim 7, wherein the computer-implemented method further comprises ranking the vocabulary term and the at least one semantic duplicate by number of occurrences in the vocabulary set to determine the most probable vocabulary term.

9. The computer-implemented method of claim 7, wherein the computer-implemented method further comprises:
   receiving a new entry for the vocabulary set, the new entry comprising a plurality of new vocabulary terms; and
   if a new vocabulary term in the plurality of new vocabulary terms comprises an occurrence value in the vocabulary set higher than a predefined occurrence value, considering the new vocabulary term for addition to the controlled vocabulary.

10. The computer-implemented method of claim 9, wherein the computer-implemented method further comprises:
    in response to determining the new vocabulary term comprises the occurrence value in the vocabulary set higher than the predefined occurrence value:
       adding the new vocabulary term to a semantic chain of the plurality of semantic chains; and
       re-ranking the semantic chain to determine the most probable vocabulary term.

11. The computer-implemented method of claim 7, wherein the computer-implemented method further comprises performing common locale data recognition on the controlled vocabulary to convert the controlled vocabulary to a common format.

12. The computer-implemented method of claim 7, wherein the computer-implemented method further comprises training a machine learning model using at least one of the vocabulary set or the controlled vocabulary.

13. The computer-implemented method of claim 12, wherein the computer-implemented method further comprises:
    receiving, from a user, a correction to the controlled vocabulary; and
    in response to receiving the correction to the controlled vocabulary, adjusting the machine learning model.

14. A system for list attribute normalization and standardization for generation of a controlled vocabulary, comprising:
    a data store;
    a processor; and
    one or more non-transitory computer-readable media storing computer-executable instructions that, when executed by the processor, perform a method for list attribute normalization and standardization for generation of the controlled vocabulary, the method comprising:
       retrieving, from the data store, a vocabulary set, the vocabulary set comprising a plurality of vocabulary terms;

identifying, for each vocabulary term in the vocabulary set, at least one semantic duplicate in the vocabulary set, the identifying comprising computing a Levenshtein distance between the vocabulary term and the at least one semantic duplicate;

forming, for each vocabulary term in the vocabulary set, a semantic chain, the semantic chain comprising the vocabulary term and the at least one semantic duplicate;

determining, for each semantic chain, a most probable vocabulary term; and inserting the most probable vocabulary term into the controlled vocabulary.

15. The system of claim 14, wherein the method further comprises replacing the semantic chain with the most probable vocabulary term to reduce a dimensionality of the vocabulary set.

16. The system of claim 14, wherein identifying the at least one semantic duplicate comprises determining a set of synonyms for the vocabulary term.

17. The system of claim 14, wherein the method further comprises:

storing the plurality of vocabulary terms in a first vocabulary set; and storing the at least one semantic duplicate in a second vocabulary set.

18. The system of claim 14, wherein the method further comprises:

receiving a second plurality of vocabulary terms; and extending the controlled vocabulary by adding a most probable vocabulary term from the second plurality of vocabulary terms to the controlled vocabulary.

19. The system of claim 14, wherein the method further comprises:

receiving an update to the vocabulary set to obtain an updated vocabulary set; and if an occurrence of the most probable vocabulary term in the updated vocabulary set drops below a threshold occurrence level, removing the most probable vocabulary term from the controlled vocabulary.

20. The system of claim 14, wherein the method further comprises:

receiving a new entry for the vocabulary set, the new entry comprising a plurality of new vocabulary terms; and if a new vocabulary term in the plurality of new vocabulary terms comprises an occurrence value in the vocabulary set higher than a predefined occurrence value, considering the new vocabulary term for addition to the controlled vocabulary.

* * * * *